July 29, 1958 L. A. DURANT 2,845,270
ELECTRICALLY CONTROLLED MARKSMANSHIP PRACTICE APPARATUS
Filed Nov. 16, 1954 7 Sheets-Sheet 1
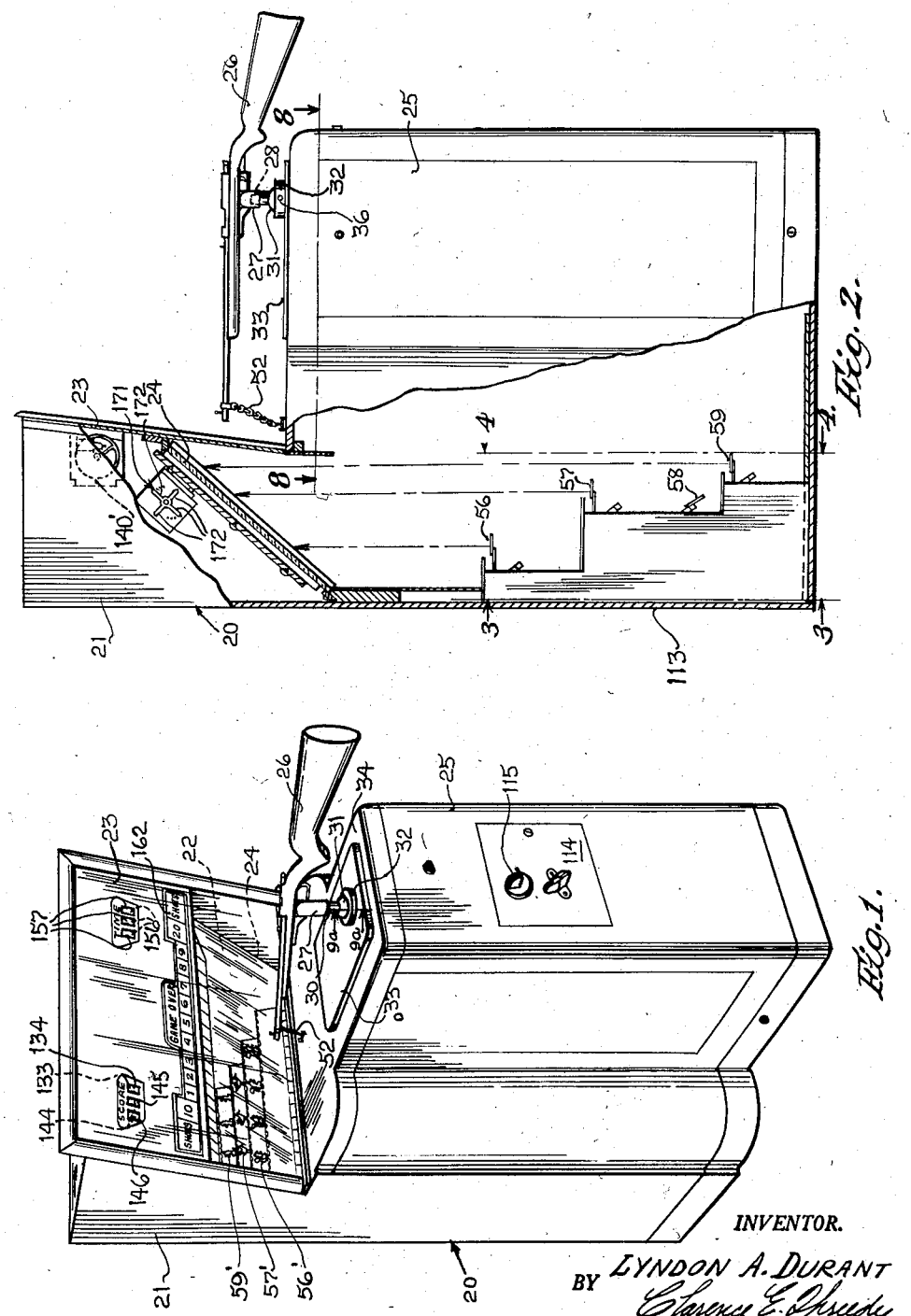
INVENTOR.
BY LYNDON A. DURANT
HIS ATTORNEY.

July 29, 1958 L. A. DURANT 2,845,270
ELECTRICALLY CONTROLLED MARKSMANSHIP PRACTICE APPARATUS
Filed Nov. 16, 1954 7 Sheets-Sheet 2

INVENTOR.
LYNDON A. DURANT
BY Clarence E. Threedy
HIS ATTORNEY.

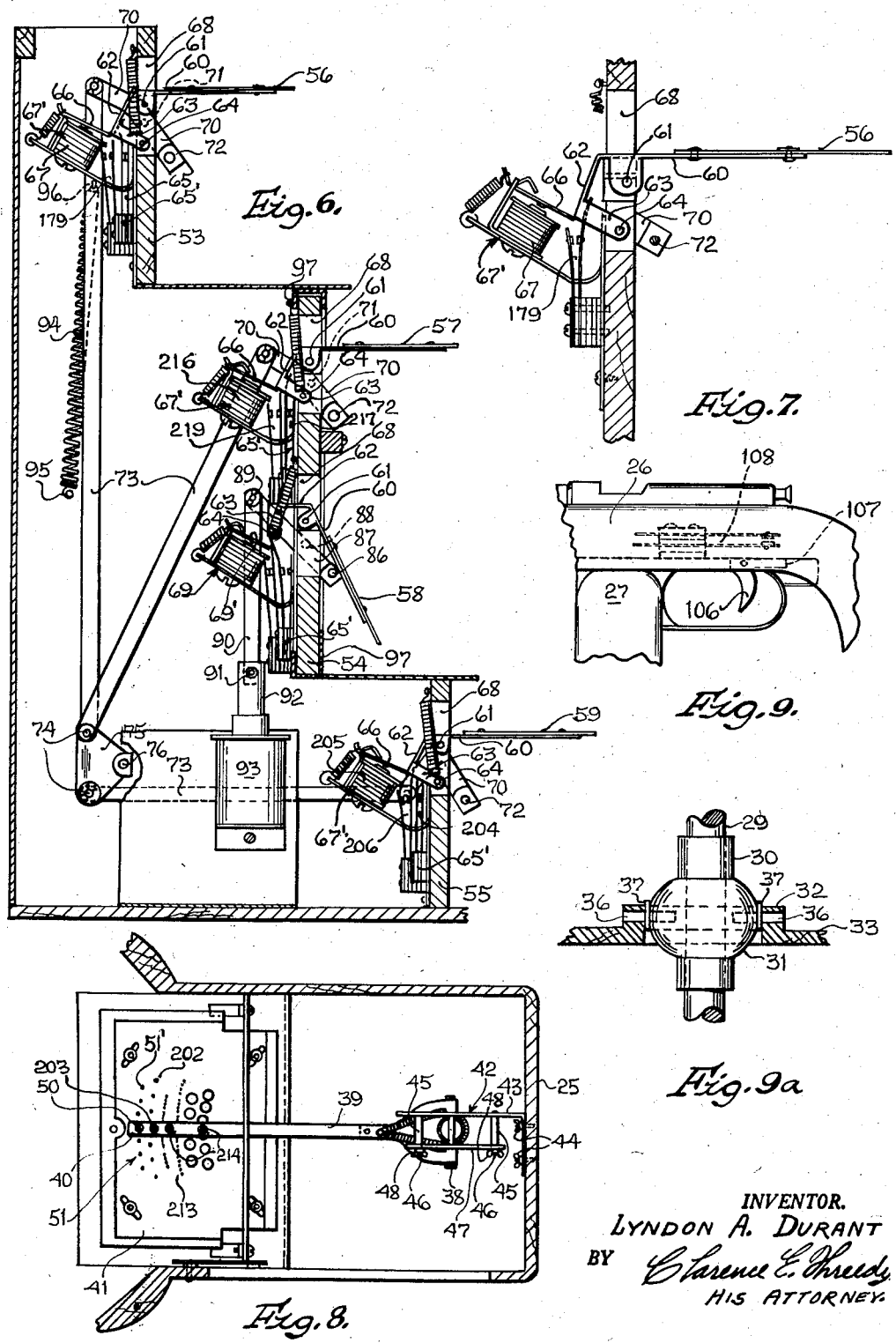

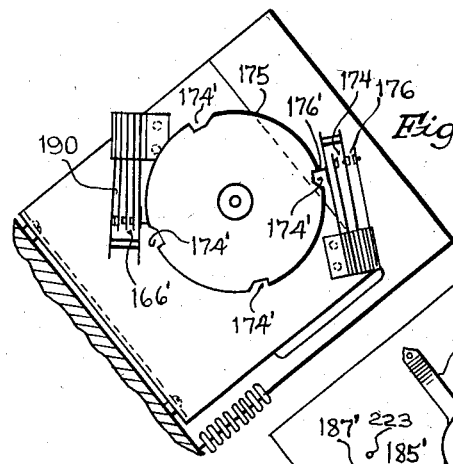
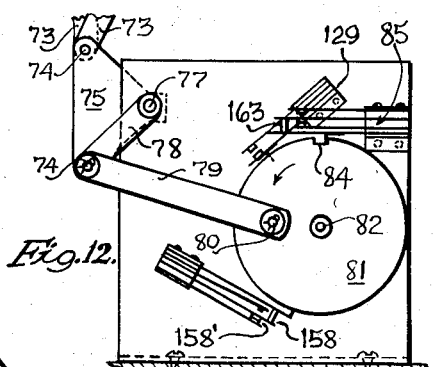
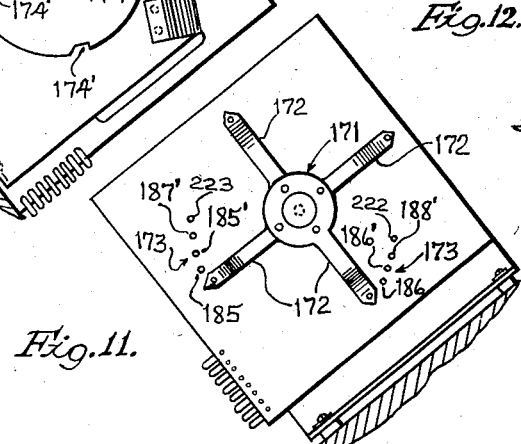
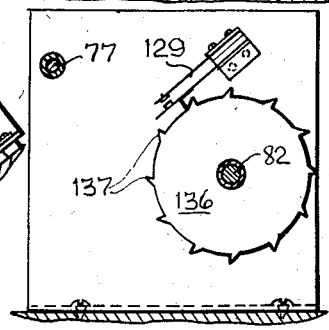
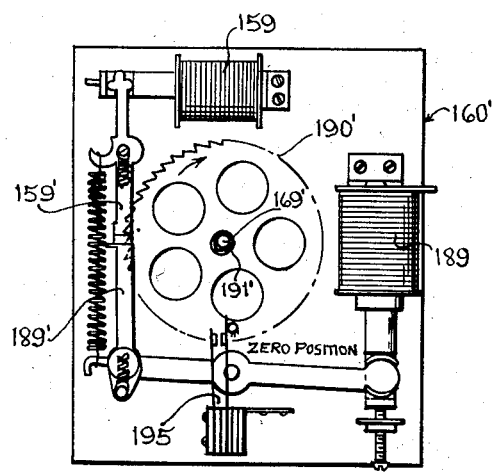
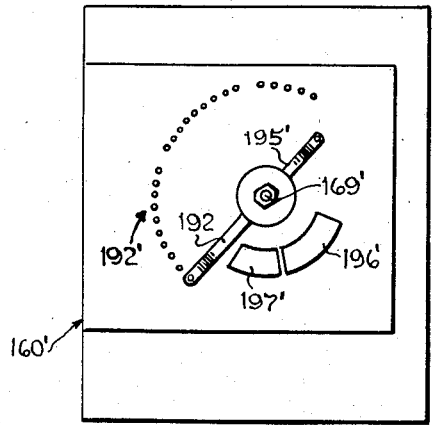

INVENTOR.
LYNDON A. DURANT

July 29, 1958

L. A. DURANT 2,845,270

ELECTRICALLY CONTROLLED MARKSMANSHIP PRACTICE APPARATUS

Filed Nov. 16, 1954

INVENTOR.
LYNDON A. DURANT
BY Clarence E. Threedy
HIS ATTORNEY.

July 29, 1958 L. A. DURANT 2,845,270
ELECTRICALLY CONTROLLED MARKSMANSHIP PRACTICE APPARATUS
Filed Nov. 16, 1954 7 Sheets-Sheet 7

INVENTOR.
LYNDON A. DURANT
BY
HIS ATTORNEY.

United States Patent Office 2,845,270
Patented July 29, 1958

2,845,270

ELECTRICALLY CONTROLLED MARKSMANSHIP PRACTICE APPARATUS

Lyndon A. Durant, Chicago, Ill.

Application November 16, 1954, Serial No. 469,158

2 Claims. (Cl. 273—101.2)

This invention relates to an electrically controlled marksmanship practice apparatus in which the results of accurate aim and timely firing are attained through the coordination of electrical mechanism.

An object of the invention consists in providing an electrically controlled timing mechanism operable to register by visual means the time consumed by the marksman in the attainment of the score accomplished by him out of a given number of shots.

Ancillary to the foregoing object is the provision in a target practicing apparatus of the character herein described of an arrangement for encouraging competitive playing of the apparatus or the encouragement of a single marksman to attain a high score within the shortest period of time out of a predetermined number of given shots.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of a target practicing apparatus embodying my invention;

Fig. 2 is a side elevational view partly in section, of the same;

Fig. 6 is a sectional detail view taken substantially on line 6—6 of Fig. 4;

Fig. 7 is a fragmentary sectional detail view taken substantially on line 7—7 of Fig. 3;

Fig. 8 is a sectional detail view taken substantially on line 8—8 of Fig. 2;

Fig. 9 is a detail view of a trigger switch embodied in the invention;

Fig. 9a is a fragmentary sectional detail view taken substantially on line 9a—9a of Fig. 1;

Fig. 10 is an elevational view of a score motor cam embodied in the invention;

Fig. 11 is an elevational view of the side opposite to shown in Fig. 10, illustrating a spider disc having scanning arms;

Fig. 12 is an elevational view taken substantially on line 12—12 of Fig. 3, showing the reset motor cam;

Fig. 13 is a sectional detail view taken substantially on line 13—13 of Fig. 3, of the reset motor embodied in the invention;

Fig. 19 is an elevational view of a suggested shot step-up unit incorporated in the invention;

Fig. 20 is an elevational view of the reverse side of the shot step-up unit.

Figure 3:
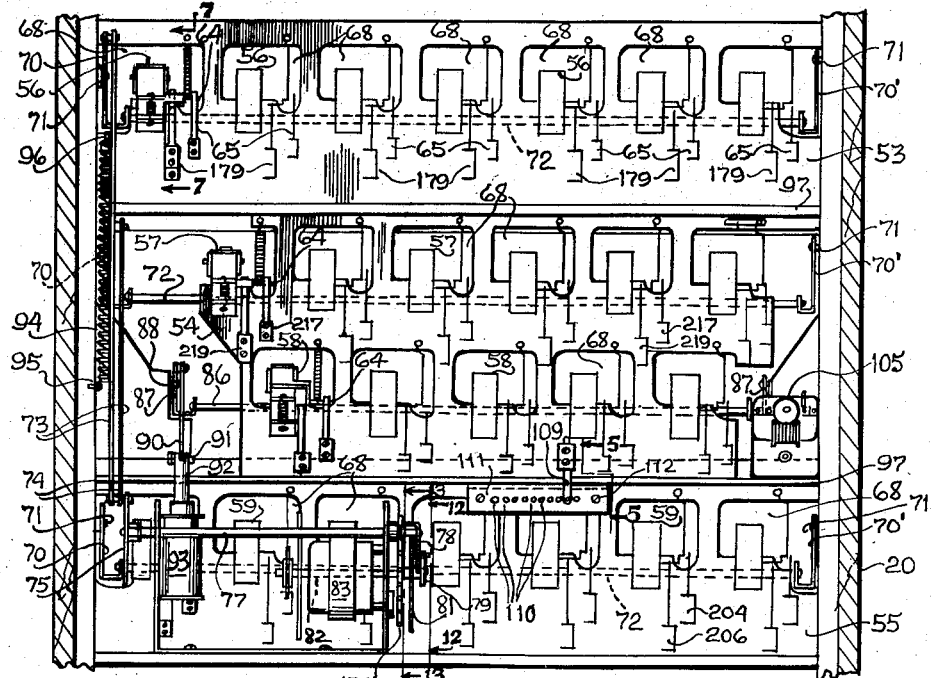
Fig. 3 is a fragmentary rear elevational view taken substantially on line 3—3 of Fig. 2.

The several objects of my invention are preferably accomplished by the preferred form of construction shown in the accompanying drawings, in which drawings there is illustrated a cabinet 20 within which the operating mechanism of the apparatus is housed. The upper portion of this cabinet 20, indicated at 21, provides a target range 22 having a transparent closure plate 23 and comprising a mirror 24 inclined with respect to a horizontal plane in a direction upwardly and forwardly of the cabinet 20 (Fig. 2).

The forward or front portion of the cabinet 20 provides a gun mounting cabinet 25 on which a simulated rifle 26 is mounted for movement through a vertical as well as a horizontal plane so as to permit the marksman to direct the rifle at any point within the confines of the mirror 24, on which mirror images of targets are reflected. This rifle 26 provides a socket member 27 into which one end portion 28 of a shaft 29 (Fig. 9a) is fixedly secured. This shaft 29 projects through a sleeve 30 and is adapted for rotation about the long axis of the sleeve. The sleeve 30 provides an intermediate spherical enlarged portion 31 mounted within a collar 32 of a plate 33 fixedly secured in any suitable manner to the top wall 34 of the gun cabinet 25. The enlarged portion 31 of the sleeve 30 is mounted for pivotal movement relative to the collar 32 by means of trunnions 36 mounted in bearings 37 provided by the collar 32. The socket member 27 rests upon the upper end portion of the sleeve 30 whereby to support the rifle 26 in the position shown in Figs. 1 and 2.

Pivoted by means of a pin 38 (Fig. 8) to the lower end portion of the shaft 29, is a scanning arm 39 which extends laterally from the shaft 29 with its outer end portion 40 disposed over a contact bearing plate 41 arranged in a suitable manner within the gun cabinet 25 (Fig. 8).

To regulate the freedom of movement of the rifle, I provide a clamping yoke 42 comprising a stationary bar 43 fixed to the front wall of the gun cabinet 25 (Fig. 8) as at 44. Extending laterally from this bar 43 on opposite sides of the shaft 29 are pins 45 having reduced threaded end portions 46 which extend through openings formed in a bar 47 arranged on the side of the shaft 29 opposite the bar 43. By tightening the finger nuts 48, the clamping effect between the bars 43 and 47 upon the shaft 29 may be decreased or increased to increase or decrease the freedom of movement of the rifle 26. The length of the studs or pins 45 is less than the diameter of the shaft 29 so as to permit the clamping effect of the bars 43 and 47 upon the shaft 29.

The scanning arm 39 carries a plurality of spaced contacts 50 which are adapted to engage, according to the position of the rifle, stationary contacts 51 (Fig. 8). These contacts 50 are more fully described in connection with the electric circuit more fully described hereinafter.

As shown in Figs. 1 and 2, the movement of the rifle 26 about its mounting is limited by a suitable chain 52.

Arranged within the cabinet 20 in stepped relation with respect to each other are a plurality of vertically disposed panels 53, 54 and 55 (Fig. 6). These panels are adapted to support targets 56, 57, 58 and 59 in a plane below the mirror 24 (Fig. 2), whereby the targets which extend in a horizontal plane when in non-hit position will be reflected in the mirror in full view of the marksman, as at 56', 57' and 59'.

These targets are of similar construction and each are mounted upon an arm 60 (Fig. 7). The arm 60 is pivoted to its respective panel as at 61. Each arm 60 includes an angled extension 62 carrying a lateral finger 63 having a stud shaft 64 thereon and adapted to engage an adjacent switch leaf of a switch unit 65' for purposes hereinafter explained with respect to the electrical circuit embodied in the invention. The extension 62 is adapted to have latched engagement with the latch 66 of an electromagnet 67', whereby the target is retained in its horizontal non-hit position until released by the latch 66.

The targets 56, 57, 58 and 59 project through suitable openings 68 formed in the panels 53, 54, and 55. As will be seen in Fig. 6, the targets 58 are disposed in a downwardly inclined position out of the plane of reflection with respect to the mirror 24. These targets 58 assume a horizontal position in the plane of reflection of the mirror 24 under certain conditions hereinafter set forth, and when in such position the targets 58 are held in latched position by mechanism similar to that employed in connection with the targets 56, 57, and 59, which mechanism includes an electromagnet 69 and a latch 69' (Fig. 6).

Suitable means is provided for resetting the targets from a hit position to a non-hit position. In connection with the targets 56, 57 and 59, this mechanism includes arms 70 and 70' (Fig. 3) pivotally connected to their respective panels 53, 54 and 55 as at 71 (Fig. 6). Corresponding ends of the arms 70 and 70' carry rods 72 which extend forwardly of the panels beneath the targets. When the targets are in a hit position, the arms 60 will engage the rods 72 and when the arms 70 and 70' are pivoted in an anti-clockwise direction as viewed in Fig. 6, the rods 72 will bear upon the arms 60 and pivot the targets to a horizontal non-hit position shown in Figs. 6 and 7.

This pivotal movement of the arms 70 is accomplished by a mechanism comprising links 73 pivoted to the arms 70 and having opposite end portions pivoted as at 74 (Fig. 6) to a plate 75 in turn fixedly secured to the end portion 76 of a shaft 77 (Figs. 3 and 12). The opposite end portion of the shaft 77 has fixedly secured thereto (Fig. 12) a link 78 in turn pivotally connected to a link 79 eccentrically connected as at 80 to a disc 81 mounted on a shaft 82 of a suitable motor 83. The disc 81 has a cam slot 84 which cooperates with a switch unit 85 (Fig. 12) hereinafter more fully referred to in connection with the electric circuit embodied in the invention.

Upon energization of the motor 83, the shaft 82 will be rocked in a direction to pivot the plate 75 to impart movement to the links 73 in a direction to pivot the arms 70 in an anti-clockwise direction for the purposes hereinbefore set forth.

With respect to the targets 58, the mechanism for resetting these targets comprises a resetting rod 86 carried by arms 87, pivoted to the panel 54 as at 88. One of these arms has its end portion pivotally connected as at 89 (Fig. 6) to a link 90 in turn pivotally connected as at 91 to a plunger 92 of an electromagnetic solenoid 93.

A spring 94 (Fig. 6) has one end portion connected as at 95 to the adjacent side wall of the cabinet and an opposite end portion as at 96 to the link 73 adjacent thereto. This spring 94 functions to yieldably retain the arms 70 in the position shown in Fig. 6.

Figures 4, 5:
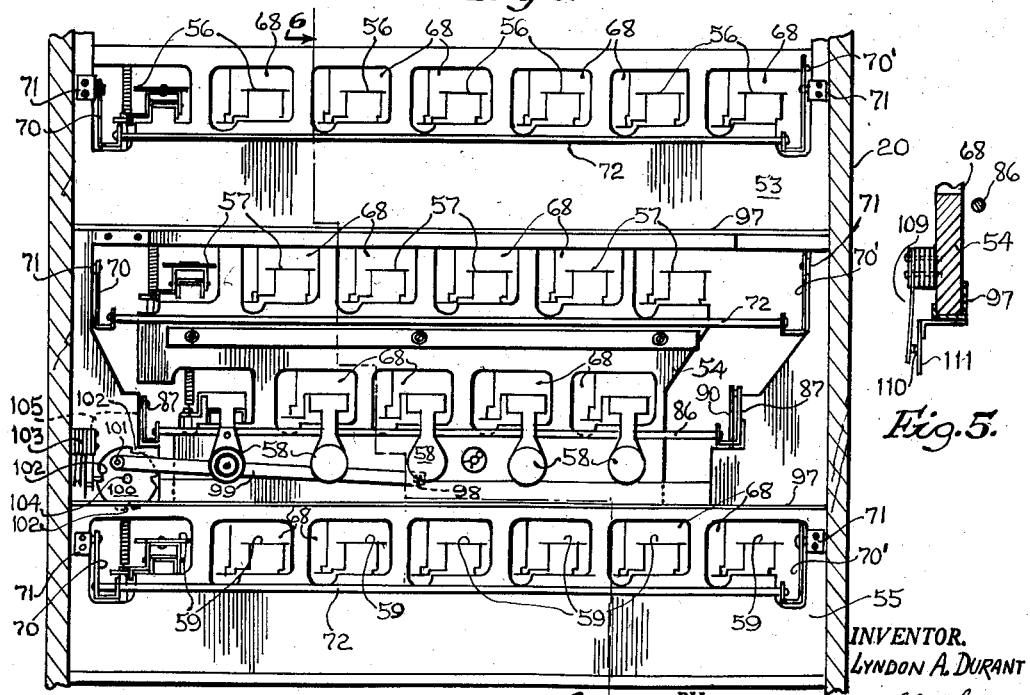
Fig. 4 is a fragmentary front elevational view taken substantially on line 4—4 of Fig. 2.
Fig. 5 is a fragmentary sectional detail view taken on line 5—5 of Fig. 3.

The panel 54 is mounted for transverse reciprocation with respect to the cabinet. This is accomplished by mounting the long edges of the panel 54 in channels 97 (Figs. 3–6). As shown in Fig. 4, there is connected to the panel 54 as at 98 one end portion of a link 99, the opposite end portion of such link being connected eccentrically to a disc 100 as at 101. This disc is provided with cam steps 102 which cooperate with a switch 103 for the purpose and in the manner hereinafter set forth in connection with the electrical circuit to be described. The disc 100 is fixedly mounted on the shaft 104 of a suitable motor 105. By operation of this motor 105, the panel 54 will be caused to reciprocate transversely with respect to the cabinet. Such arrangement makes it more difficult for the marksman to accomplish a hit when the gun is aimed in the direction of the targets carried by this movable panel and to exercise a greater degree of skill.

The simulated rifle 26 includes a trigger 106 having an extension 107 (Fig. 9) adapted to act upon a switch unit 108 for the reasons and in the manner hereinafter set forth in connection with the electric circuit.

The panel 54, as shown in Fig. 3, carries a scanning contact finger 109 which moves over and in contact with stationary contacts 110 carried by a non-conductive plate 111 attached as at 112 to the channel 97. As will be explained in connection with the electric circuit (Fig. 16), these contacts 110 are connected in series with certain of the contacts carried by the contact plate 41. The arrangement is such that in order for the marksman to accomplish a hit, it is necessary that the finger 109 engage a contact 110 in series with the contact carried by the plate 41 in the circuit of the particular coil of the target which the marksman has the rifle trained upon.

The back wall 113 of the cabinet is removable to permit access to the interior of the cabinet. On the gun mounting cabinet 25 is a door 114 carrying a coin slot 115 for directing a coin to a coin-actuated switch. This switch may be of any approved construction and is referred to more particularly in the electric circuit now to be described.

Figure 14:
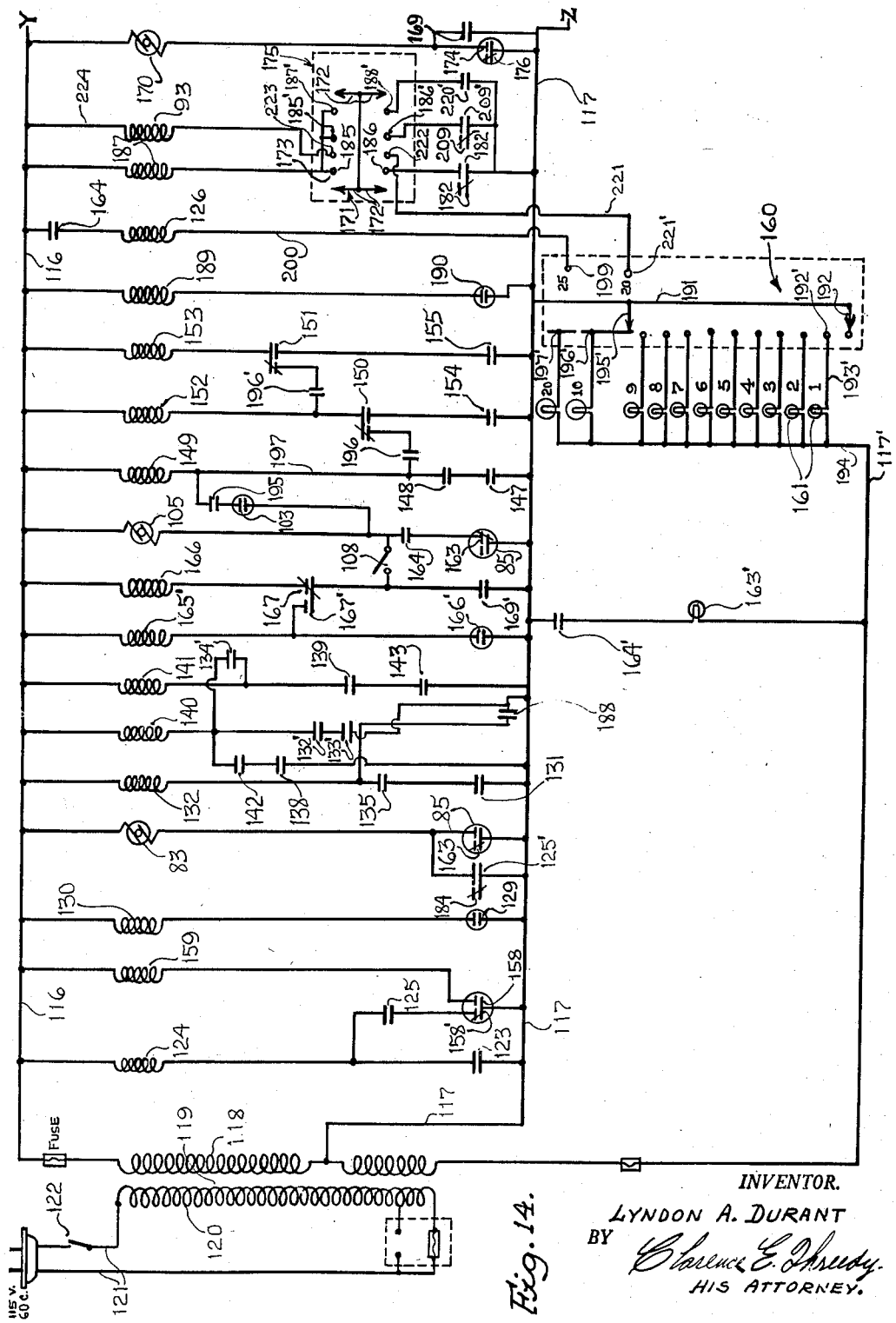
Fig. 14 is a schematic view of an electric circuit embodied in the invention.
Figure 15:
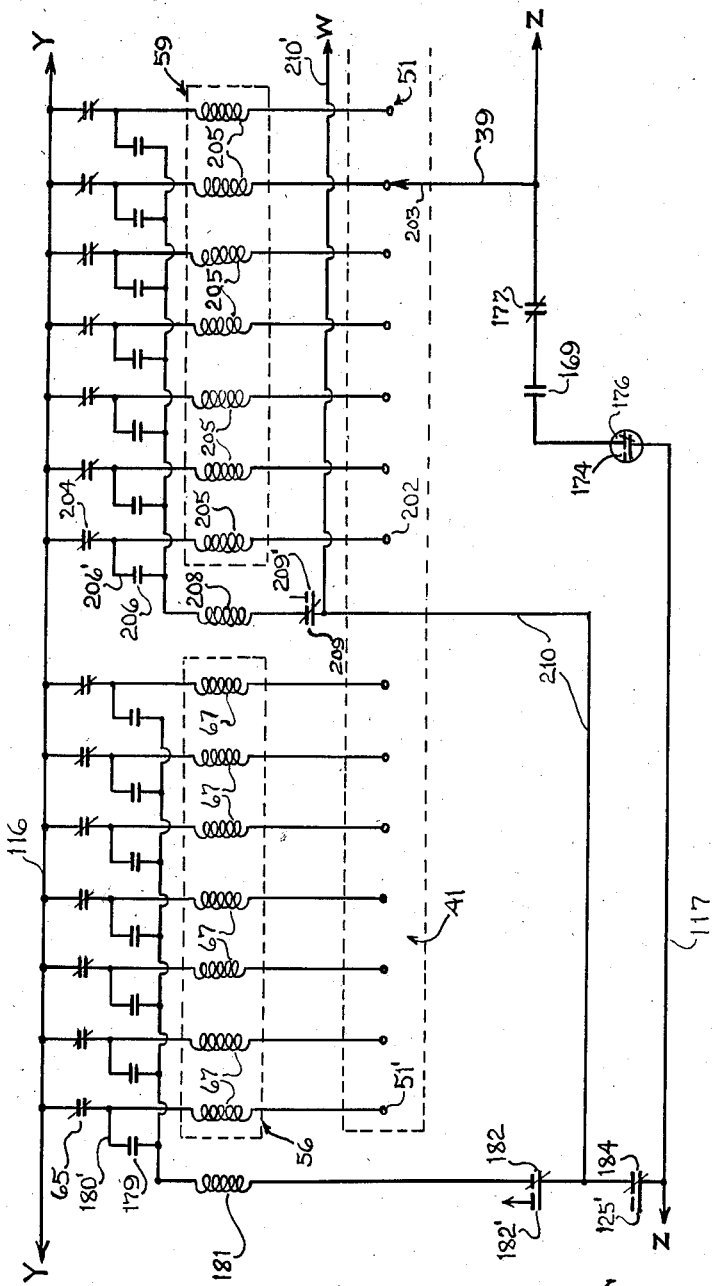
Fig. 15 is a continuation of the schematically illustrated circuit shown in Fig. 14.
Figure 16:
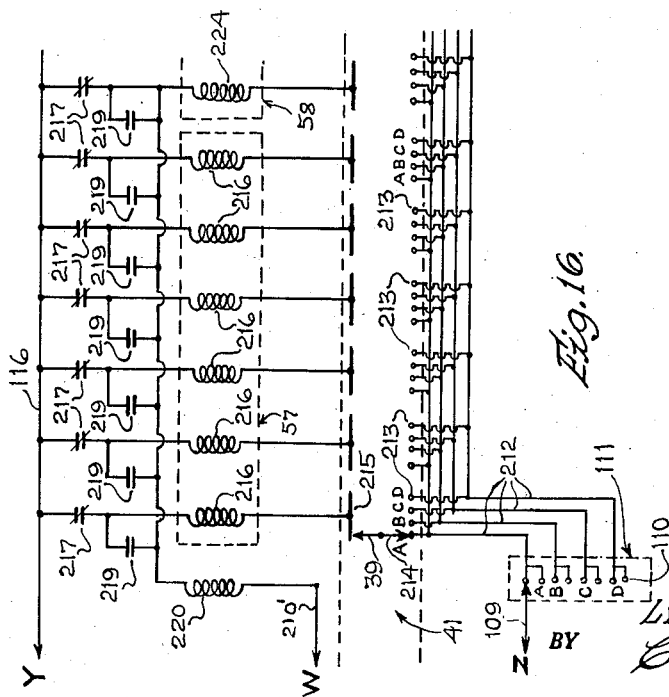
Fig. 16 is a continuation of the schematically illustrated circuit shown in Fig. 15.

The electric circuit in question is schematically illustrated in Figs. 14 to 16 inclusive and will be best understood by a description of its operation.

Essentially there are three circuits, to-wit: a resetting circuit which functions to reset the operative parts to starting or playing condition, a playing circuit, and a timing circuit. Each of these circuits will be taken up in the order mentioned.

In the circuit illustrated, two parallel lines indicate a normally open switch. When such lines are crossed by a diagonal line, the symbol indicates a closed switch, and when encircled, it indicates operation of the switch by a motor cam.

The power lines are indicated at 116 and 117. These lines are connected to the secondary side 118 of a transformer 119, the primary side 120 of which is connected to the main power lines 121, in one of which lines is a master switch 122. Conditioning the apparatus for play is started by the deposit of an acceptable coin in the coin slot 115 (Fig. 1). Such coin closes switch 123 (Fig. 14). Upon closing of the switch 123, a starting relay coil 124 is energized, closing a starting relay switch 125 to hold the circuit to the starting relay coil 124 energized (Fig. 14).

Figure 17:
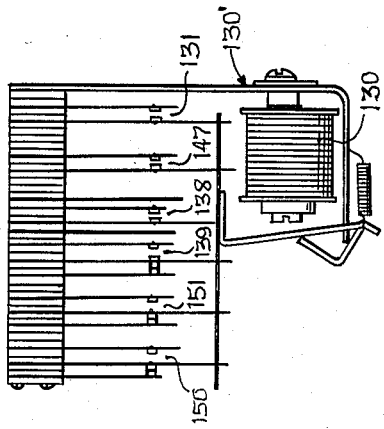
Fig. 17 is a schematic illustration of a reset relay embodied in the invention.
Figure 18:
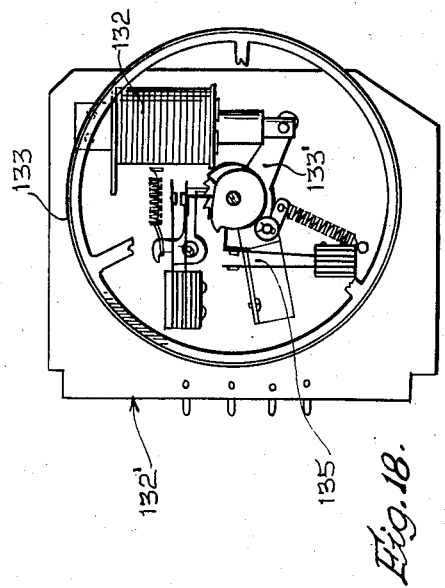
Fig. 18 is an elevational view of a conventional score step-up drum, with parts broken away.

The starting relay coil 124 also momentarily closes a normally open starting relay switch 125' (Fig. 14). The closing of this switch 125' energizes a target reset motor 83 (Figs. 3 and 12). Initial rotation of such motor closes the switch 85 to hold the circuit for the motor 83 for one cycle of rotation during which rotation the targets are reset in the manner hereinbefore described. This switch 85 (Fig. 12) is closed by the cam disc 81. The target reset motor 83 has a disc 136, provided with equally spaced cam teeth 137 which engage and momentarily close a normally open switch 129 (Fig. 13). Closing of the switch 129 completes a circuit to the reset relay coil 130 of relay 130' (Fig. 17). This relay 130' is made up of a number of switches hereinafter identified. The reset relay coil 130 closes a normally open reset relay switch 131. Closing of this switch 131 completes a circuit to the score step-up relay coil 132 of a 1–9 step-up unit 132'. Such a unit is shown in Fig. 18 and includes an indicia bearing drum 133, the numbers of which run from 1 to 9 and are successively exposed through a sight opening 134 (Fig. 1) as the drum is advanced step by step by a stepping-up dog 133'.

The coil 132 can only be energized when the score drum 133 is off starting or zero position, at which time a switch 135 (Fig. 18) is closed and remains closed until the drum 133 is returned to zero position.

The reset relay coil 130 also closes the reset relay switches 138 and 139 (Figs. 14 and 17) of the 10–90 score step-up coil 140 and the 100 score step-up coil 141, respectively of step-up units 140' (Fig. 2). The units are similar in construction to that of the 1–9 step-up unit 132' (Fig. 18). Each includes an indicia bearing drum 144, the numbers of which are successively exposed through sight openings 145 and 146, respectively (Fig. 1), in a manner hereinafter set forth. Like in the case of the 1–9 step-up unit 132', if the 10–90 score drum 144 is off zero position, the switch 142 will be closed to complete the circuit to the 10–90 score step-up relay coil 140.

Similarly, if the 100 score step-up drum 144 is off zero position, the switch 143 will be closed to complete the circuit to the coil 141.

Thus far, the circuit has been effective to step-up the drums 133 and 144 until zero is exposed through the sight openings, at which time the drums are in zero position and switches 135, 142 and 143 are opened.

The reset relay coil 130 when energized in the manner hereinbefore described also closes the reset switch 147 (Fig. 14), which, when the switch 148 is closed, completes a circuit to a 1–9 timer step-up coil 149. Simultaneously with this action, reset relay switches 150 and 151 are closed by the reset relay coil 130 to complete a circuit to the 10–90 timer step-up coil 152 and the 100 timer step-up coil 153 when the switches 154 and 155 are closed. The switches 148, 154, and 155 are closed when the drums 156 of the timer step-up coils 149, 152 and 153 are not in zero position.

The numerals of the timer drums 156 are successively exposed through sight openings 157 (Fig. 1).

At a predetermined point in the rotation of the reset motor disc 81 (Fig. 12), a normally open switch 158 is closed to complete a circuit to a shot step-up reset coil 159 (Fig. 14). This coil 159 resets the shot counter 160 (Fig. 14) to zero position. Upon closing of the switch 158, switch 158' is opened to deenergize the start relay coil 124.

The shot mechanism 160 (Figs. 14, 19 and 20) includes a shot step-up unit 160' similar in construction and operation to that shown and described in Patent No. 2,618,719. Only so much of the shot step-up unit is illustrated in Figs. 19 and 20 as is thought necessary for an understanding of the present invention, it being understood that any conventional form of shot step-up unit may be used. As shown in the drawings, the shot step-up unit 160' includes a step-up coil 189 having a step-up dog 189' which acts upon a ratchet wheel 190' to advance the same step by step against the action of a returning or resetting spring 191'. The resetting coil 159 operates a holding arm 159' in the manner described in Patent No. 2,618,719 to disengage the dog 189' to permit the ratchet wheel 190' to return to zero position. On the shaft 169' are contact fingers 192 and 195' engageable with stationary contacts 192' hereinafter referred to more in detail.

The shot counter 160 also includes a plurality of incandescent lamps 161 arranged to the rear of a translucent section 162 of the closure 23 (Fig. 1). This translucent section 162 has appearing thereon numerals 1–9 and 10 and 20 to indicate by illumination thereof the shots which the marksman has taken.

The operation of the target reset motor 83 returns all targets to non-hit position through the operation of the mechanism hereinbefore described, including the reset rods 72 and 86 (Figs. 3 and 4).

After the cam 81 of the target reset motor 83 (Fig. 12) has completed one cycle of rotation and has returned to its starting or zero position, switch 163 (Fig. 14) will be closed, as will the game-over switch 164 (closed in a manner hereinafter set forth), to complete a circuit to the target moving motor 105, which, in one of its functions, effects reciprocation of the targets 57 and 58 in the manner hereinbefore described.

The resetting of the apparatus having now been completed, the apparatus is now conditioned for play.

The marksman holds the rifle 26 in the usual conventional manner and sights a selected target. He then pulls the trigger 106 which closes the trigger switch 108 (Figs. 9–14). The closing of this switch 108 completes a circuit to the score motor relay coil 166 through a normally closed trigger relay switch 167, the game-over relay switch 164 (normally closed during the playing of the apparatus), and the normally closed switch 163, which latter switch is closed when the reset motor is in starting or zero position.

The score motor relay coil 166 remains energized to hold the score motor relay switches 169 and 169' closed until second-position score motor switch 166' is closed, when the score motor 170, hereinafter referred to, reaches a predetermined position, at which time the closing of the switch 166' energizes the trigger relay coil 165'. Energization of this trigger relay coil 165' opens switch 167 and closes switch 167', thus deenergizing the score motor relay coil 166 which in turn opens switch 169' and switch 169.

When energized, the coil 166 will close the normally open score motor relay switch 169 (Fig. 14) to energize the score motor 170. On the shaft of this motor is a spider disc 171 having four arms 172 (Fig. 11). These arms 172 successively engage the contacts indicated generally at 173 and which will be more specifically referred to hereinafter.

As soon as the score motor 170 leaves its starting or zero position, the normally open switch 174 (Fig. 14) is closed to hold the motor 170 energized after the score motor relay switches 169 and 169' have been opened as hereinbefore described, to rotate a cam disc 175 (Fig. 10) on the shaft thereof through one-quarter cycle of rotation, for scoring purposes. In this connection, certain of the targets entitle the marksman to a score of one point, others to two points, and still others to three points. The deenergization of the score motor 170 at each quarter rotation of the motor is effected by providing four equally spaced notches 174' in the disc 175 into which the switch holding finger 176' moves to operate the switch 174.

In the event that the contacts of the scanning arm 39 of the rifle 26 (Fig. 8) are not in contact with any of the contacts 51, no score will be registered by the score drums 133 and 144 because of an incomplete circuit to the score step-up units, which include the coils 132, 140 and 141. However, if the scanning finger 39 is in contact with one of the contacts 51, such, for example, the contact indicated at 51' (Fig. 15), the following will take place:

The circuit to the electromagnetic target release coil 67 will be completed from line 117 through the normally closed score motor switch 176 (Fig. 16), the closed score motor relay switch 169, the normally closed one-point relay switch 177, and the normally closed target-actuated switch 65 (Fig. 15) to line 116. The energization of this coil 67 actuates the latch armature 66 (Figs. 6 and 9) to release the selected target for pivotal movement into a hit position. If the target thus released entitles the marksman to a score of one-point, the 1–9 score step-up coil 132 (Fig. 14) will be energized and advance the drum 133 thereof one step to display the number 1 as the score thus attained.

The score value of 1 of the selected target which has been released to pivot to hit position is registered in the following manner:

The score relay coil 187 (Fig. 14) which controls the circuit to the score step-up coils 132, 140 and 141, will be energized when the scanning arm 171 of the score motor 170 is in contact with the contact points 185 and 186 and the one-point relay switch 182' is closed (Figs. 14 and 15). The closing of this one-point relay switch 182' is accomplished through the following circuit:

From line 117 through switch 176, Fig. 15 (closed when the score motor 170 is in zero position), switch 169 which is closed by the score motor relay coil 166 (Fig 14), normally closed one-point relay switch 177, scanning arm 39, target trip coil 67, normally closed switch 65, to line 116.

The target trip coil 67 by this circuit having been energized, releases the target for pivotal movement to hit position. During such movement of the target, the arm 64 thereof closes the switch 179 prior to opening of the switch 65, so that a circuit is set up from line 116 through switch 65, line 180', switch 179, one-point trip relay coil 181, normally closed one-point relay switch 182, through start relay switch 184, to line 117. Energization of the one-point trip relay coil 181 opens switches 182 and 177 and closes switch 182' to complete the circuit to the score relay coil 187 (Fig. 14).

This latter circuit then is from line 117 through one-point relay switch 182', scanning disc 171, score relay coil 187, back to line 116. As the target completes its movement to a hit position, the switch 65 is opened and the switch 179 held closed, to deenergize the one-point trip relay coil 187 to again close switch 182 and open switch 182' and close switch 177.

When the score relay coil 187 is energized, score relay switch 188 (Fig. 14) is closed to complete a circuit to the 1–9 score step-up coil 132. Energization of the coil 132 steps up the 1–9 score drum 133 to display through the sight opening 134 (Fig. 1) the number 1, which is the score value of the target moved to hit position.

Each time the 1–9 score drum 133 reaches its 9th position, the score drum 133 closes a ninth-position 1–9 switch 132' so that a circuit will be set up to the 10–90 score step-up coil 140 from line 116 through the coil 140, through the now closed switch 132', through the closed score relay switch 133' to line 117.

Each time the 10–90 score drum 144 reaches its 9th position, it closes a ninth position 10–90 switch 134', so that a circuit will be set up to the 100 score step-up coil 141 from line 116 through the 100 score step-up coil 141, through the now closed switch 134', through the now closed switch 132', the closed score relay switch 133' to line 117.

Had the marksman selected the two-point score targets 59, the following would have taken place:

The score relay coil 187 will be energized when the scanning disc 171 is in contact with the contact points 185' and 186' and the two-point relay switch 209' is closed. Closing of this two-point relay switch 209' is accomplished through the following circuit:

From line 117 through switch 176 through score motor relay switch 169, one-point relay switch 177, scanning arm 39, the contact 203 thereof, contact 202 (Fig. 8 and 15), target trip coil 205, switch 204, to line 116.

The target trip coil 205 by this circuit having been energized, the selected target 59 is released for pivotal movement to a hit position. During movement of the target to hit position, the arm 64 thereof closes the switch 206 prior to opening of switch 204, so that a circuit is set up from line 116 through switch 204, line 206', switch 206, two-point trip relay coil 208, normally closed two-point relay switch 209, line 210, through start relay switch 184, to line 117. Energization of the two-point trip relay coil 208 opens switch 209 and closes switch 209', to complete the circuit to the score relay coil 187, thus resulting in the energization of the score coil 132 to step the 1–9 drum 133 two steps to display the score of 2 through the sight opening 134.

This stepping up of the 1–9 score drum 133 takes place as the spider disc 171 passes over the contacts 173, which are designated as 185 and 186 and 185' and 186'.

This latter score relay coil circuit is then from line 117 through two-point relay switch 209', scanning disc 171, pairs of contact points 185 and 186 and 185' and 186', respectively, score relay coil 187, back to line 116. As the target completes its movement to a hit position, switch 204 is opened and switch 206 held closed, to deenergize the two-point relay coil 208 (Fig. 15) to again close switch 209 and open switch 209'.

When the contacts 214 (connected in series) of the scanning arm 39 are in contact with the contact plate 215 (Fig. 16) and any one of the contacts 213, the circuit to the score relay coil 187 is substantially the same as in the case of the two-point score targets, there being a branch line 210' from the line 210 (Fig. 16) which is connected to the three-point relay coil 220, in turn connected with the switches 217 and 219, in the manner shown in Fig. 16. These switches 217 and 219 are actuated by the trip arm of the three-point score targets 57 and 58 when released by the target trip coils 216. The three-point relay coil 220, upon energization, closes switch 220' (Fig. 14) in the circuit to the score relay coil 187.

To score the three points constituting the score value of any one of the targets 57 and 58, the spider disc 171 moves successively into engagement with the pairs of contacts 185 and 186 and 185' and 186' and 187 and 187', respectively, and upon engagement with each pair of such contacts, the 1–9 score drum 133 is advanced three steps to register the number 3 as the score attained, such number being displayed through the sight opening 134.

As before stated, if the marksman attains a score of 10, the 10–90 score step-up coil 140 is energized by the closing of the ninth position switch 132' of the 1–9 score drum 133. Likewise, if the marksman attains a score of 100, the 100 score step-up coil 141 is energized by the closing of the ninth position switch 134' of the 10–90 score drum 144. By this arrangement, the score may be registered as high as 999.

In the case of the three-point score targets there is incorporated in the circuit thereof the feature of a circuit controlled by the moving reciprocating target hereinbefore described. The device may be used without such circuit. However, the employment of such moving target circuit renders the obtaining of a shot more difficult and calls upon the marksman for a greater exercise of skill. The circuit is illustrated in Fig. 16. As shown there (Fig. 16), the contacts 110 are arranged in pairs, with the pairs connected by lines 212 in parallel with sets of the contacts 213, with each set consisting of at least four contacts. A contact 214 of the scanning arm 39 is adapted to pass over these sets of contacts as well as to engage the contact plate 215, there being one plate for each set of contacts 213. These plates 215 are in circuit with the target trip coils 216.

The arrangement is such that should at the time a contact 214 of the scanning arm 39 have contact with one of the contacts of one of the sets of contacts 213, which one contact is in series with one of the contacts 110 by reason of the engagement therewith of the wiper finger 109, the coil 216 of the selected target will be energized to permit the target to drop to a hit position. The scoring will take place in the manner described herein in connection with the three-point score targets.

At a predetermined point in the one-quarter revolution of the score motor 170, the normally open switch 190 is closed to energize the shot step-up relay coil 189. This relay coil 189 steps up the shot counter 160 to complete a circuit with the first of the incandescent lamps 161 (Fig. 14) to designate one shot. The circuit to this lamp 161 is from line 117 through line 191, movable contact finger 192, contact 192', line 193', lamp 161, line 194, to line 117'.

The shot counter 160 has twenty-five contacts 192' arranged in three sets, two sets consisting of nine contacts each and the third of five contacts, each in contact with one of the lamps 161.

As successive shooting is accomplished by the marksman, the finger 192 (Figs. 14–20) will move successively over the first nine contacts 192' to successively energize the lamps 161. As the finger 192 passes off the last of the nine contacts, finger 195' passes onto a contact plate 196' (Figs. 14–20), to energize the lamp designating the 10th shot. When the finger 192 passes off the ninth contact of the second set of contacts 192', finger 195' passes off the plate 196' onto the plate 197' to energize the lamp designating the 20th shot. The finger 192' continues to move over the next five contacts to successively energize the lamp of the 21st to 25th shot. By this arrangement, the shots may be registered from 1 to 25.

Simultaneously with the first closing of the trigger switch 108, the timing circuit is energized to step-up the timing drums 156 thereof. This is accomplished in the following manner:

As soon as the shot step-up coil 189 is energized, the normally open switch 195 (Fig. 14) is closed, as is the moving target impulse switch 103 (which latter switch is momentarily closed by the action of the cam disc 100 of the moving target motor 105) to set up a circuit to the 1-9 timer step-up coil 149. Through the action of the momentary opening and closing of switch 103 by the moving target motor disc, such coil 149 will advance step-by-step the drum 156 of the 1-9 step-up timer unit until it reaches the ninth position, at which time the 10-90 coil becomes energized by the closing of the switch 196, the circuit from such switch 196 then being through line 197, switch 195, switch 103, through switch 163, to line 117.

Each time the 1-9 step-up timer drum 156 reaches the ninth position, the 10-90 step-up timer drum will advance one step until the 10-90 timer step-up drum 156 reaches 99. At this point of the operation, the 10-90 switch 196' will be closed to establish a circuit to the 100 step-up unit 153 through switch 150, switch 196, line 197, switch 195, switch 103, to line 117, so that the 100 step-up unit will be stepped up each time the 10-90 step-up unit passes 99.

These time indicating units continue to operate in step-by-step operation until the game-over switch 164 is opened.

The game-over relay switch 164 (Fig. 14) is opened upon energization of the game-over trip relay coil 126. This coil is energized when the movable finger 192 of the shot step-up unit engages a contact 199 (25th lamp contact), which engagement takes place after the 25th shot, at which time a circuit will be set up from line 116, through game-over relay switch 164, coil 126, line 200, finger 192, line 191, to line 117. When the game-over trip relay coil 126 is thus energized, the game-over relay switch 164' will be closed to energize a game-over relay light 163' to indicate by illumination that the game is over.

Should the marksman fail to coordinate the scanning arm 39 of the rifle 26 with a contact in the circuit of a selected target, no score will be recorded. However, the shot step-up unit will function to register the number of the shot, and the timing circuit will function to start timing the period consumed by the marksman in the attainment of the ultimate score accomplished by him out of a given number of shots registered by the shot step-up unit.

Summarizing the operation of the apparatus:

Upon the deposit of a proper coin, the apparatus is reset by moving the targets to non-hit position, returning the score and timer drums to zero position, and conditioning the playing circuit for play.

The marksman selects a particular target, for example, a one-point score target. If his line of sight is upon such selected target, the scanning arm 39 of the rifle 26 should have a contact thereof on one of the contacts 51. If such be the case, the coil of that selected target is energized, the target drops to hit position, the one-point trip relay coil 181 is momentarily closed to establish a scoring circuit, which circuit is operative in the manner hereinbefore stated to advance the first of the scoring drums 133 one step to expose a score of 1 through the sight opening.

Upon first pull of the trigger 106, the timing circuit becomes energized and the timer drums 156 successively advanced step-by-step to record the period of time that it takes the marksman to complete twenty-five shots. By means of this timer circuit, the marksman is not only enabled to engage in competitive shooting but is enabled to determine how long it took him to complete the twenty-five shots and over what period of time it took him to accomplish the total score.

In the case of the two-point score targets, the operation is substantially the same as that of the one-point score targets, except that the score drum 133 is stepped up two steps, each time a hit is accomplished (instead of one step), to expose a score of 2 through the sight opening 134.

As an added attraction, after the nineteenth shot, five additional targets 58 may be presented by reflection in the mirror in non-hit position. This is accomplished as the finger 192 passes onto the twentieth contact 221' of the shot counter to complete the circuit to the solenoid coil 93, from lines 117', 194, 193', finger 192, contact 221', line 221, contact 222, arms 172, contact 223, solenoid coil 93, line 224, to line 116. Energization of the solenoid coil 93 will cause rod 86 to pivot the targets (bull's eyes) 58 to a non-hit position.

The trip coils 224 for the targets 58 are in a circuit similar to that for the trip coils 216, one of such trip coils 224 being shown in Fig. 16.

By incorporating in a target practicing apparatus the structure and circuits hereinbefore described, it is obvious that I provide not only a mechanism for timing the time consumed by the marksman in the attainment of a score by him out of a given number of shots, but also provide an apparatus which encourages competitive play.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A target practicing apparatus of the class described comprising a playing circuit, including a manually operated switch, a conditioning circuit for conditioning the playing circuit for play, means for effecting operation of the conditioning circuit, a timing circuit, said manually operated switch being operative upon initial actuation to render the timing circuit effective independently of said playing circuit and means actuated by the manually operated switch after a predetermined number of actuations thereof and upon completion of the play for rendering said playing circuit and timing circuit ineffective.

2. A target practicing apparatus of the class described comprising a playing circuit, including a manually operated switch, a conditioning circuit for conditioning the playing circuit for play, means for effecting operation of the conditioning circuit, a timing circuit, said manually operated switch being operative upon initial actuation to render the timing circuit effective independently of said playing circuit and means actuated by the manually operated switch after a predetermined number of actuations thereof and upon completion of the play for rendering said playing circuit and timing circuit ineffective, said timing circuit including a timing device and time registerng means and means for advancing said timing device and said time registering means step-by-step independently of said playing circuit.

References Cited in the file of this patent

UNITED STATES PATENTS

| | | |
|---|---|---|
| 679,325 | McCullough | July 30, 1901 |
| 2,225,502 | Lauterbach | Dec. 17, 1940 |
| 2,404,653 | Plebanek | July 23, 1946 |
| 2,497,003 | Larson | Feb. 7, 1950 |
| 2,618,719 | Durant | Nov. 18, 1952 |
| 2,710,754 | Varney | June 14, 1955 |

FOREIGN PATENTS

| | | |
|---|---|---|
| 1,086,319 | France | Aug. 4, 1954 |